US007269156B2

(12) United States Patent
Kanazawa (10) Patent No.: US 7,269,156 B2
(45) Date of Patent: Sep. 11, 2007

(54) HIGH-FREQUENCY CIRCUIT DEVICE (75) Inventor: Kunihiko Kanazawa, Muko (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 343 days.

(21) Appl. No.: 11/056,467

(22) Filed: Feb. 11, 2005

(65) Prior Publication Data

US 2005/0201350 A1    Sep. 15, 2005

(30) Foreign Application Priority Data

Feb. 18, 2004    (JP)    ............... 2004-041935

(51) Int. Cl.
*H04B 7/216* (2006.01)
(52) U.S. Cl. ............. 370/342; 370/337; 370/347; 455/127.3; 455/339; 455/552.1; 330/133
(58) Field of Classification Search ............. 370/145, 370/276, 296, 335, 350, 320, 321, 336, 337, 370/342, 343, 347; 455/127, 437, 436, 553, 455/127.1, 2, 3, 313, 335, 338, 339, 341, 455/550.1, 552.1, 572; 330/123, 126, 133, 330/295
See application file for complete search history.

(56) References Cited

U.S. PATENT DOCUMENTS

| | | | |
|---|---|---|---|
| 5,689,817 A | | 11/1997 | Fok |
| 5,794,159 A | * | 8/1998 | Portin ............... 455/553.1 |
| 6,415,158 B1 | * | 7/2002 | King et al. ............ 455/552.1 |
| 6,490,440 B1 | | 12/2002 | Mielke et al. |
| 6,567,653 B1 | * | 5/2003 | Sanders ............... 455/126 |
| 6,763,015 B1 | * | 7/2004 | Phillips et al. ........... 370/347 |
| 2002/0049075 A1 | * | 4/2002 | Takagi ............... 455/553 |
| 2004/0047306 A1 | * | 3/2004 | Katagishi et al. ........ 370/320 |
| 2004/0097210 A1 | | 5/2004 | Sato |

(Continued)

FOREIGN PATENT DOCUMENTS

JP    9-232992    9/1997

(Continued)

OTHER PUBLICATIONS

Japanese Office Action for the corresponding Japanese application 2004-041935, mailed Oct. 26, 2006.

*Primary Examiner*—Edward F. Urban
*Assistant Examiner*—Nhan T. Le
(74) *Attorney, Agent, or Firm*—Hamre, Schumann, Mueller & Larson, P.C.

(57) ABSTRACT

A high-frequency circuit device is provided that is conformable to both of the TDMA system and the CDMA system as well as a plurality of frequency bands and achieves low cost and low power consumption. The high-frequency circuit device has a configuration including a transmission amplifier circuit for transmitting high-frequency power from an antenna that is composed of a high-frequency amplifier that is shared in the TDMA system and the CDMA system, a duplexer that is provided for performing simultaneous transmission/reception according to the CDMA system, upstream and downstream switch circuits in the direction of transmission that are provided so as to sandwich the duplexer between the transmission amplifier circuit and the antenna and are switched on when the simultaneous transmission/reception is performed according to the CDMA system, and a bypass switch circuit that bypasses the upstream and downstream switch circuits and the duplexer.

6 Claims, 6 Drawing Sheets

U.S. PATENT DOCUMENTS

2004/0224643 A1 * 11/2004 Nakai .......................... 455/78

FOREIGN PATENT DOCUMENTS

| JP | 2002-135157 A | 5/2002 |
| JP | 2002-208869 A | 7/2002 |
| WO | WO 01/80436 | 10/2001 |
| WO | WO 03/061148 A | 7/2003 |
| WO | WO 2004/002098 | 12/2003 |

* cited by examiner

HIGH-FREQUENCY CIRCUIT DEVICE

BACKGROUND OF THE INVENTION

1. Field of the Invention

The present invention relates to a high-frequency circuit device in a transmission/reception part of a high-frequency radio set, specifically, a mobile communication apparatus such as a mobile phone or the like. More specifically, this invention relates to a multiband high-frequency circuit device including a semiconductor amplifier circuit (hereinafter, referred to as a transmission amplifier circuit) for high-frequency power transmission and a switch circuit for switching among a plurality of communication systems and among a plurality of frequency bands.

2. Description of the Related Art

In a transmission amplifier circuit such as in a mobile phone or the like, high-frequency power is transmitted from an antenna according to a system in which a TDMA (Time Division Multiple Access) system used in Europe and a CDMA (Code Division Multiple Access) system coexist. In such a transmission amplifier circuit, separate high-frequency amplifiers are used so as to conform to the TDMA system and the CDMA system, respectively. This is based on the following reasons. That is, there is a difference in the respective output levels obtained according to these systems. Further, another difference is that: in the TDMA system, polar modulation or polar loop modulation is performed by, for example, an EDGE (Enhanced Data rates for GSM Evolution) modulation scheme; on the other hand, in the CDMA system, specifically, a W-CDMA (Wideband-Code Division Multiple Access) system or UMTS (Universal Mobile Telecommunication System), an operation is performed based on quadrature modulation, requiring a linear amplifier, and simultaneous transmission/reception also is performed. Thus, it has been the case that separate high-frequency amplifiers are assigned with respect to the TDMA system and the CDMA system, respectively.

Figure 6:
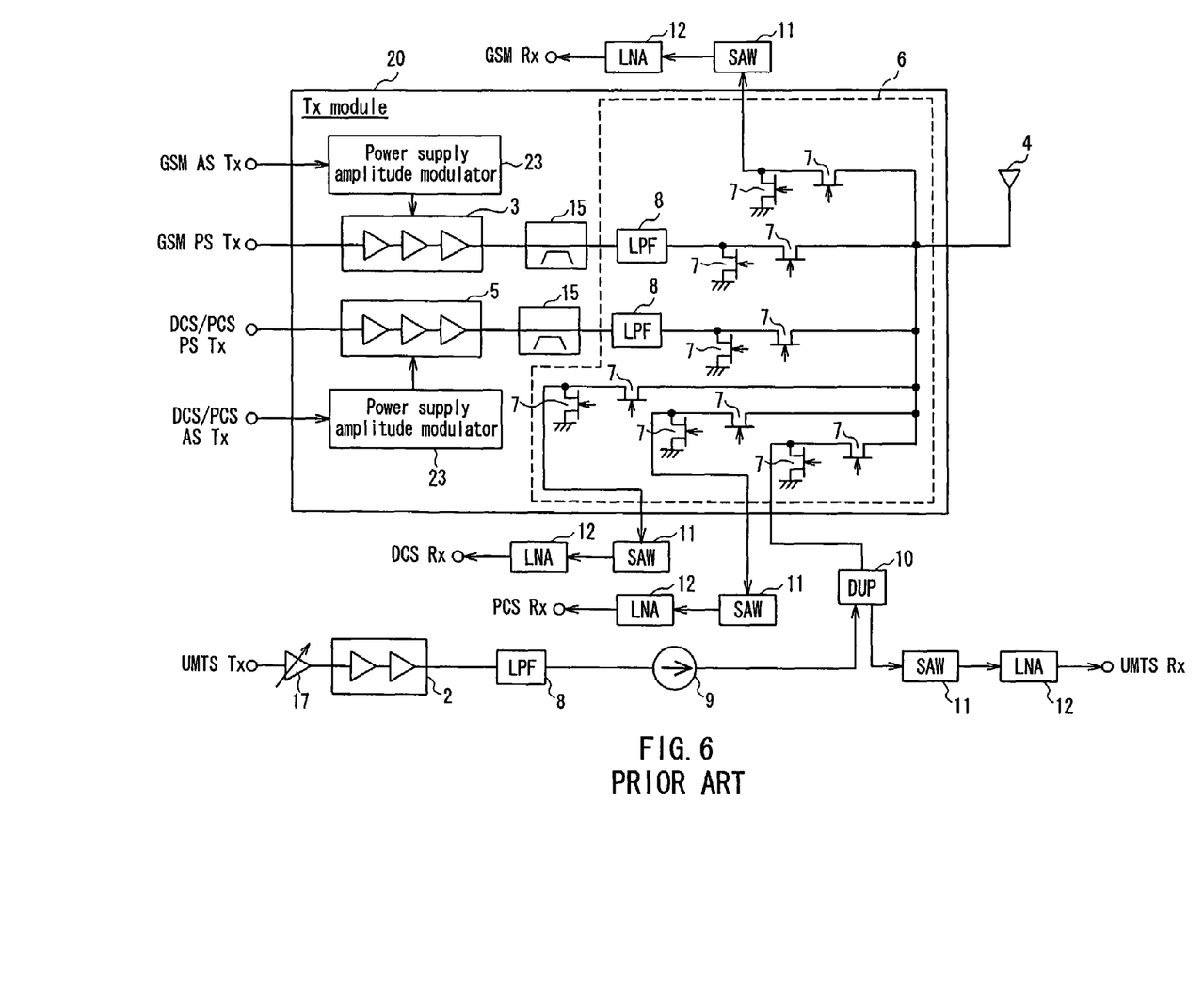
FIG. 6 is a block diagram showing an example of the configuration of a conventional high-frequency circuit device.

FIG. 6 is a block diagram showing an example of the configuration of a conventional high-frequency circuit device. As shown in FIG. 6, a GSM (Global System for Mobile Communications)-based phase signal GSM PS Tx in the frequency band of 800 to 900 MHz according to the TDMA system is input to a high-frequency amplifier 3 of a transmission amplifier circuit and amplified. Further, a DCS (Digital Cellular System)-based or PCS (Personal Communication Services)-based phase signal DCS/PCS PS Tx in the frequency band of 1,700 to 1,900 MHz according to the CDMA system is input to a high-frequency amplifier 5 of the transmission amplifier circuit and amplified.

Meanwhile, in order to perform polar modulation, GSM and DCS/PCS amplitude signals are input from two power supply amplitude modulators 23 to power supply terminals of the high-frequency amplifiers 3 and 5, respectively. In this case, the high-frequency amplifiers 3 and 5 in the polar modulation operation can be realized by a high-frequency amplifier in saturation operation. Thus, current consumption can be reduced, so that even without using an isolator, it is very unlikely that the operation is disturbed due to the output impedance of the high-frequency amplifiers.

Meanwhile, in an operation according to the UMTS (W-CDMA) system, conventionally, a signal modulated by quadrature modulation is input to a high-frequency amplifier 2. In this case, unlike the high-frequency amplifiers 3 and 5 in polar modulation operation, it is required that the high-frequency amplifier 2 be a high-frequency amplifier in linear operation, and that an isolator 9 be provided on the output side of the high-frequency amplifier 2. A UMTS signal that has been modulated by quadrature modulation is input to the high-frequency amplifier 2 through a driver amplifier 17. The signal is supplied to an antenna 4 via a low-pass filter (LPF) 8, the isolator 9, a duplexer (shared device: DUP) 10, and GaAs switches 7. The duplexer (shared device) 10 is a filter for separating signals according to their frequency bands so as to perform transmission and reception simultaneously.

Furthermore, the isolator 9 is used to avoid the deterioration of a distortion characteristic in an operation of the high-frequency amplifier 2, which might result from an impedance deviating from 50 ohms when the antenna 4 is brought close to metal or a human head. The high-frequency amplifiers 2, 3 and 5 are formed of a FET or HBT (heterobipolar transistor) that is made from GaAs, a MOS FET made from Si, or a HBT made from SiGe.

The GaAs switches 7 are provided between the antenna 4 and each of the high-frequency amplifiers and between the antenna 4 and each reception circuit so as to switch between operations of GSM and DCS/PCS transmission and reception and to switch to an operation of UMTS simultaneous transmission/reception. The GaAs switches 7 may be formed of a pin diode. Further, in many cases, the LPFs 8 for suppressing harmonics from the high-frequency amplifiers 2, 3 and 5 are integrated into a switch module 6 with these switch circuits. Further, an entire high-frequency amplifier circuit also may be integrated into a module as a Tx module 20.

However, in such a configuration according to the conventional technique, compared with the case of a conventional mobile phone that is not conformable to a system in which the TDMA system and the CDMA system coexist but is specifically to either of the systems, a plurality of high-frequency amplifiers are required, resulting in a nearly 50% cost increase, and the isolator 9 is required with respect to the UMTS, resulting in another nearly 50% cost increase. That is, this configuration leads to almost doubling the cost, which has been disadvantageous. Further, since the isolator 9 is provided, an extra electric current of 40 to 70 mA is consumed in the high-frequency amplifier 2, which also is disadvantageous.

SUMMARY OF THE INVENTION

With the foregoing in mind, it is an object of the present invention to provide a high-frequency circuit device that is conformable to both of the TDMA system and the CDMA system as well as a plurality of frequency bands and achieves low cost and low power consumption.

In order to achieve the above-mentioned object, a high-frequency circuit device according to the present invention is a high-frequency circuit device that is conformable to both of the Time Division Multiple Access (TDMA) system and the Code Division Multiple Access (CDMA) system as well as a plurality of frequency bands. The high-frequency circuit device has a configuration including a transmission amplifier circuit for transmitting high-frequency power from an antenna that is composed of a high-frequency amplifier that is shared in the TDMA system and the CDMA system, a duplexer that is provided for performing simultaneous transmission/reception according to the CDMA system, upstream and downstream switch circuits in the direction of transmission that are provided so as to sandwich the duplexer between the transmission amplifier circuit and the antenna and are switched on when the simultaneous transmission/reception is performed according to the CDMA system, and a bypass switch circuit that bypasses the upstream and downstream switch circuits and the duplexer.

According to this configuration, compared with the case of a conventional mobile phone that is not conformable to a system in which the TDMA system and the CDMA system coexist but is specific to one of the systems, the number of high-frequency amplifiers to be used can be reduced, and the need to provide an isolator further can be eliminated, and thus a cost reduction by nearly half can be achieved. Further, an electric current consumed in a high-frequency amplifier in a CDMA operation according to the UMTS or the like can be reduced by about 20%, namely, by 40 to 70 mA.

According to the present invention, a high-frequency circuit device that is conformable to both of the TDMA system and the CDMA system as well as a plurality of frequency bands and achieves low cost and low power consumption can be provided.

DESCRIPTION OF THE PREFERRED EMBODIMENTS

Hereinafter, the present invention will be described by way of preferred embodiments with reference to the appended drawings.

First Embodiment

Figure 1:
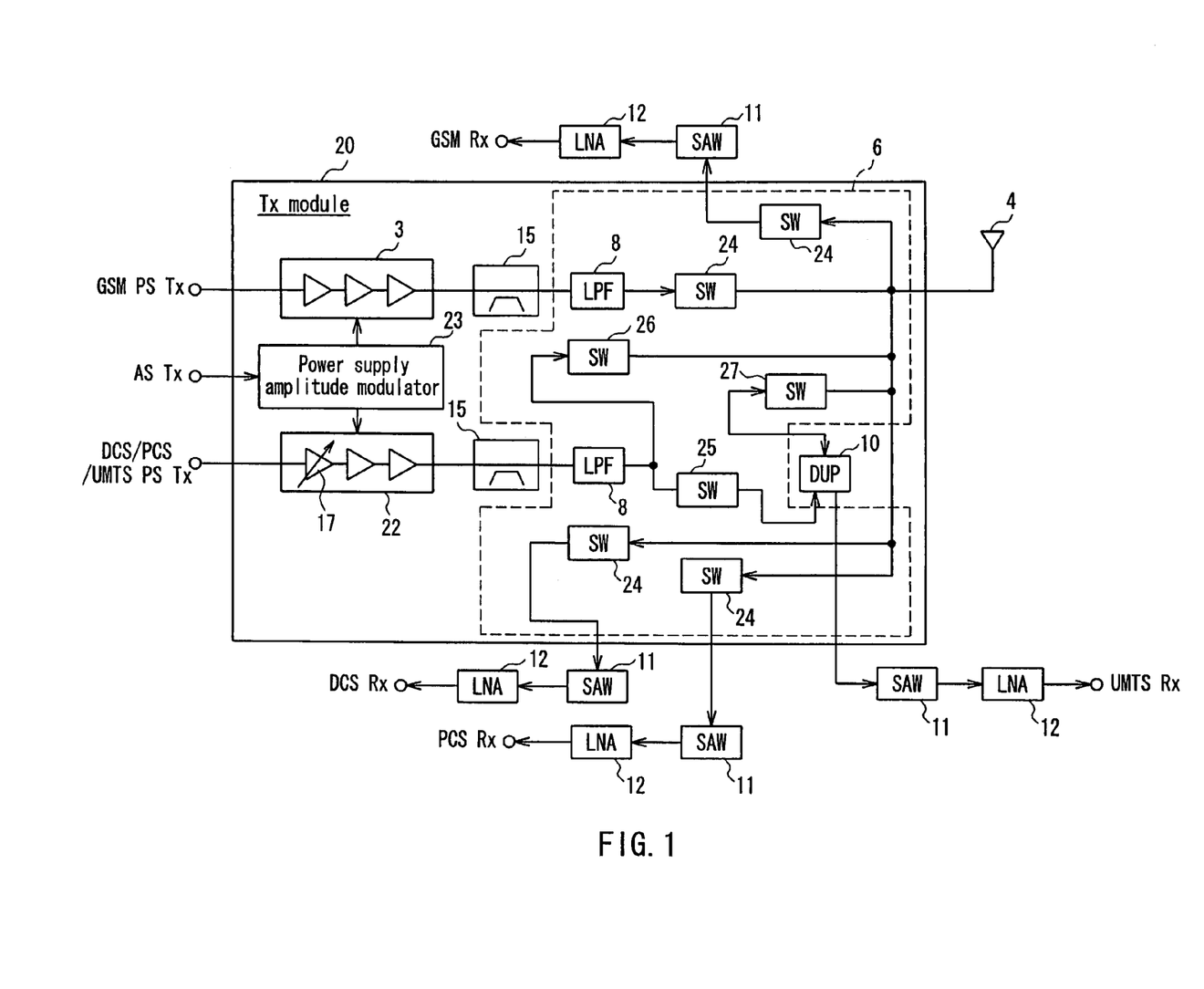
FIG. 1 is a block diagram showing an example of the configuration of a high-frequency circuit device according to a first embodiment of the present invention.

FIG. 1 is a block diagram showing an example of the configuration of a high-frequency circuit device according to a first embodiment of the present invention.

Firstly, as shown in FIG. 1, a GSM phase signal GSM PS Tx in the frequency band of 800 to 900 MHz is input to a first high-frequency amplifier 3 of a transmission amplifier circuit and amplified. Further, a DCS, PCS, or UMTS (W-CDMA) phase signal in the frequency band of 1,700 to 2,100 MHz is input to a second high-frequency amplifier 22 of the transmission amplifier circuit and amplified. In the second high-frequency amplifier 22, a gain-controllable driver amplifier 17 is housed to perform dynamic range expansion of a UMTS signal according to the CDMA system.

Meanwhile, in order to perform polar modulation, GSM and DCS/PCS/UMTS amplitude signals AS Tx are input from a power supply amplitude modulator 23 to power supply terminals of the first high-frequency amplifier 3 and the second high-frequency amplifier 22, respectively. In this case, the first high-frequency amplifier 3 and the second high-frequency amplifier 22 in the polar modulation operation can be realized by a high-frequency amplifier in saturation operation. Thus, an amplifier that is conformable to an extremely wide frequency band can be realized, and a linear amplifier that conventionally has been needed with respect to the UMTS is no longer necessary.

Furthermore, the second high-frequency amplifier 22 serves as a high-frequency amplifier that performs polar modulation and is conformable to the UMTS, thereby achieving a reduction in current consumption. Polar modulation with respect to the UMTS also can be realized by designing a duplexer (shared device) 10 with the current semiconductor technology using higher frequencies so as to avoid an influence on other frequencies when the conventional power supply amplitude modulator 23 in a high frequency operation and an isolator that will be described later are removed.

Herein, an output signal of the second high-frequency amplifier 22 is input to the duplexer (shared device: DUP) 10 via a coupler 15, a LPF 8, and an upstream switch circuit (SW) 25 in the direction of transmission. The duplexer 10 is a filter for separating signals according to their frequency bands so as to perform transmission and reception simultaneously. When an antenna 4 is brought close to metal or a human head, an impedance deviates from 50 ohms and thus might result in the deteriorationof a distortion characteristic in a UMTS operation of the second high-frequency amplifier 22. Such deterioration can be avoided by a polar modulation operation.

However, in order to further avoid an adverse effect of backflow of a transmission signal and a reception signal, which are based on the DCS or the like and originate respectively in another mobile phone and a base station, from the antenna 4 to the high-frequency amplifier 22, the duplexer 10 also has a characteristic of suppressing frequency bands of a DCS transmission signal and a DCS reception signal. This allows the realization of this suppressing function that is fulfilled conventionally by an isolator, thereby realizing a configuration without an isolator.

Furthermore, in order to switch between operations of DCS or PCS transmission and UMTS simultaneous transmission/reception, a bypass switch circuit 26 is provided between the second high-frequency amplifier 22 and the antenna 4 so as to bypass the duplexer 10. A downstream switch circuit 27 in the direction of transmission further is provided between the duplexer 10 and the antenna 4, thereby providing a configuration that allows switching into and out of a UMTS operation.

Herein, the high-frequency amplifiers are formed of a FET or HBT (heterobipolar transistor) that is made from GaAs, a MOS FET made from Si, or a HBT made from SiGe. As in the conventional case, switch circuits 24 that are connected directly to the antenna 4 are provided so as to switch over the first high-frequency amplifier 3 for GSM transmission and to switch between operations of GSM, DCS and PCS reception. These switch circuits 24, 25, 26 and 27 are formed of a high-frequency switch (SW) made from GaAs. Further, this high-frequency switch may be formed of a pin diode. Further, in many cases, the LPFs 8 for suppressing harmonics from the high-frequency amplifiers are integrated into a switch module 6 with these switch circuits. Further, an entire high-frequency amplifier circuit also may be integrated into a module as a Tx module 20. The duplexer 10 can be provided with a function of suppressing harmonics from the second high-frequency amplifier 22, and thus a configuration without the LPF 8 on the second high-frequency amplifier 22 side also is possible. The same is true of other embodiments.

As described above, according to this embodiment, compared with the conventional case, the number of high-frequency amplifiers to be used can be reduced from three to two, and the need to provide an isolator further can be eliminated, and thus a cost reduction by nearly half can be achieved. Further, an electric current consumed in the second high-frequency amplifier 22 in a CDMA operation according to the UMTS or the like can be reduced by about 20%, namely, by 40 to 70 mA.

Second Embodiment

Figure 2:
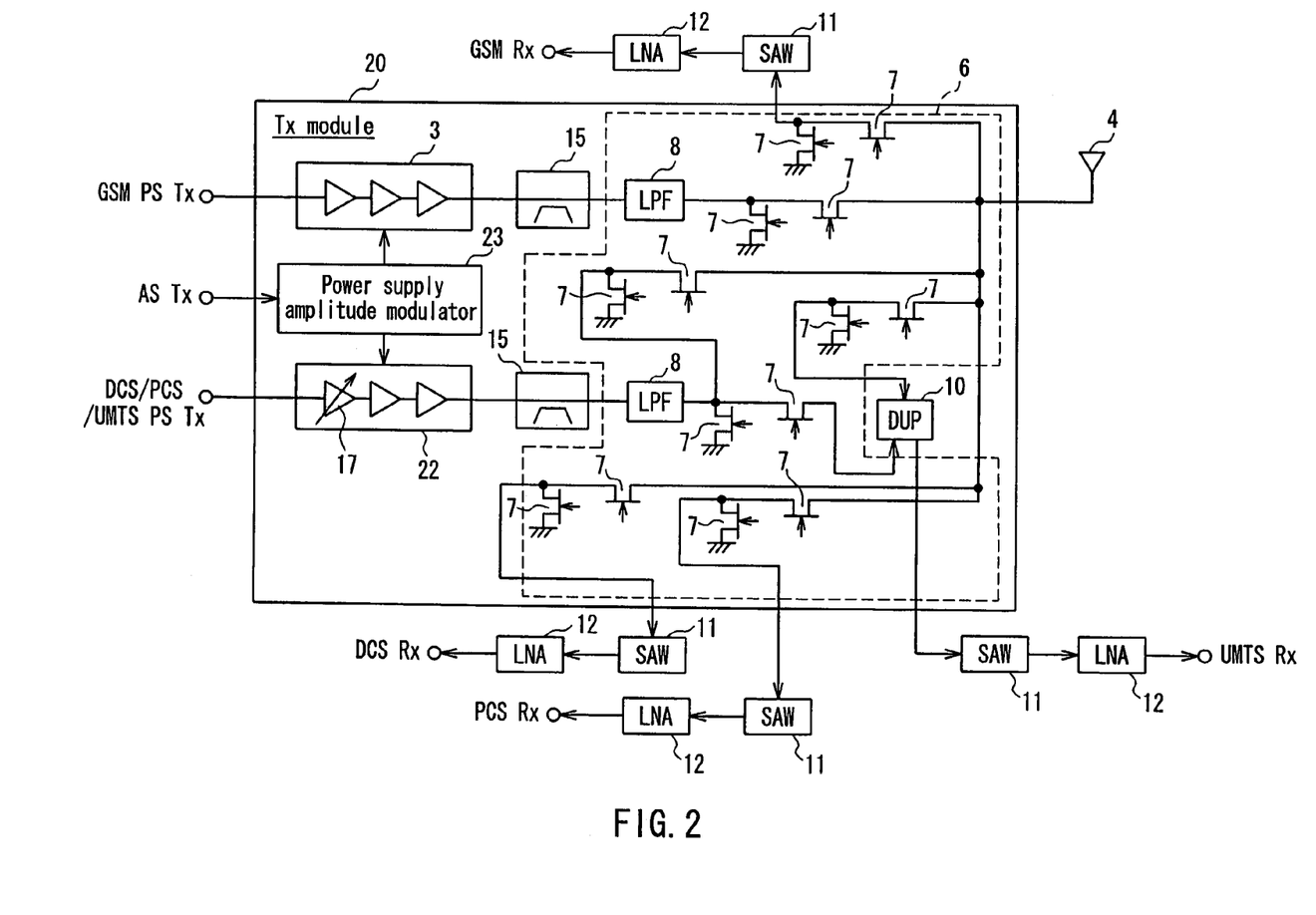
FIG. 2 is a block diagram showing an example of the configuration of a high-frequency circuit device according to a second embodiment of the present invention.

FIG. 2 is a block diagram showing an example of the configuration of a high-frequency circuit device according to a second embodiment of the present invention.

As shown in FIG. 2, with respect to the first embodiment, this embodiment presents a specific circuit configuration in which the switch circuits 24 to 27 are substituted by GaAs switches 7, respectively. The GaAs switches are formed of a HEMT, and particularly by thus allowing them to have a submicron gate length, a loss can be reduced by 0.3 to 0.4 dB compared with the case of using a pin diode, thereby allowing current consumption in a high-frequency amplifier to be reduced by about 10%.

Third Embodiment

Figure 3:
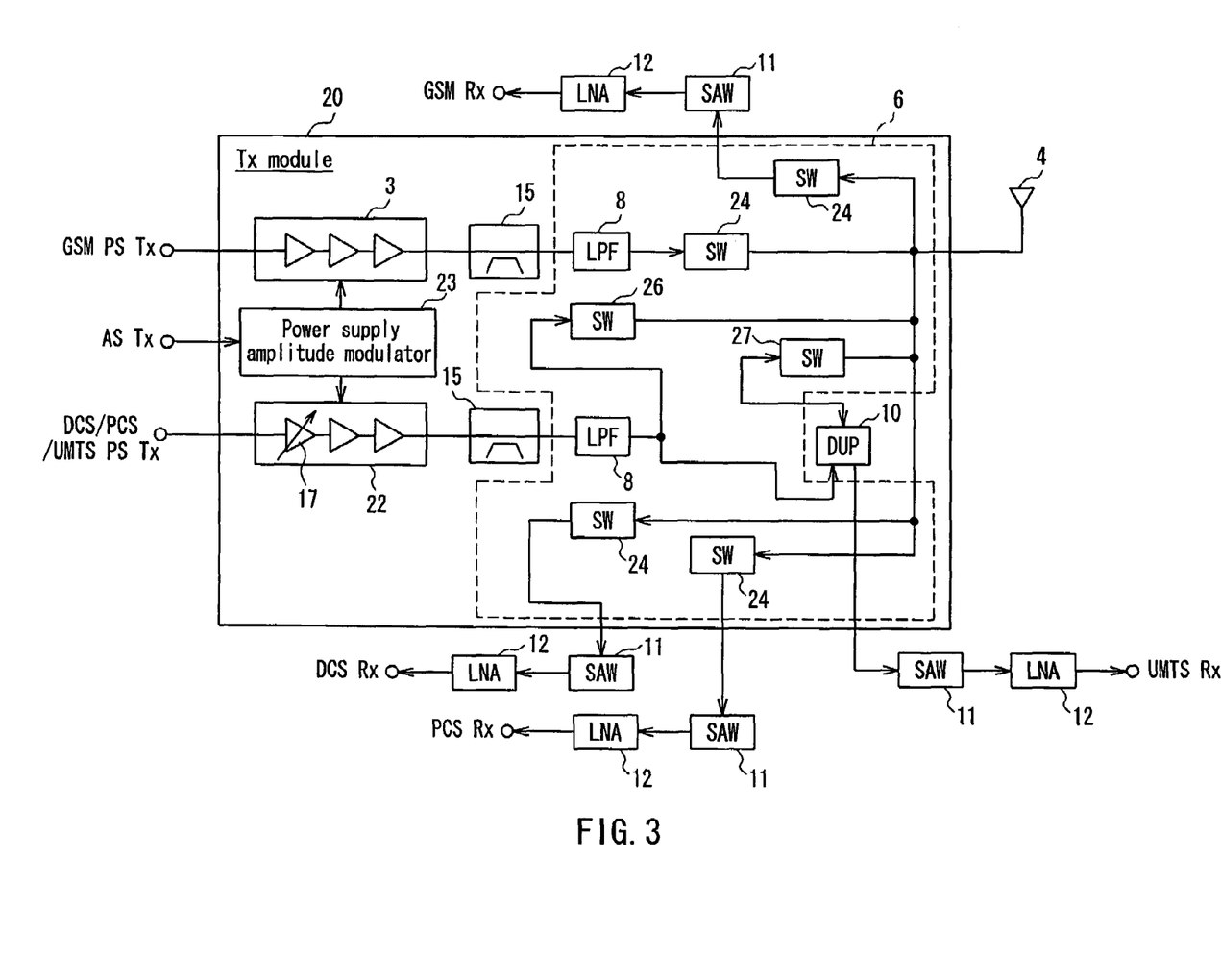
FIG. 3 is a block diagram showing an example of the configuration of a high-frequency circuit device according to a third embodiment of the present invention.

FIG. 3 is a block diagram showing an example of the configuration of a high-frequency circuit device according to a third embodiment of the present invention.

Firstly, as shown in FIG. 3, compared with the first embodiment of the present invention, when performing a UMTS operation, with respect to UMTS transmission, the upstream switch circuit 25 on the output side of the second high-frequency amplifier 22 does not exist, and a transmission signal is input from a second high-frequency amplifier 22 directly to a duplexer (shared device: DUP) 10. The duplexer 10 has a characteristic of suppressing frequency bands of a DCS transmission signal and a DCS reception signal. This allows the realization of a suppressing function that is fulfilled conventionally by an isolator, thereby allowing a configuration without an isolator to be provided. Moreover, where the antenna 4 side is seen from the second high-frequency amplifier 22, in DCS and PCS operations, an increased output impedance can be obtained. Therefore, by adjusting the matching of the second high-frequency amplifier 22, where the antenna 4 side is seen from the second high-frequency amplifier 22, the output impedance obtained in the DCS and PCS operations can be set to 50 ohms.

To be more specific, in DCS and PCS transmission operations and not in a UMTS operation, a downstream switch circuit 27 is switched off, and a bypass switch circuit 26 is switched on, thereby enabling the transmission operations based on the DCS and PCS. Further, when performing UMTS simultaneous transmission/reception, the downstream switch circuit 27 is switched on, and the bypass switch circuit 26 is switched off, thereby also allowing the UMTS simultaneous transmission/reception to be realized as in the first embodiment of the present invention.

As described above, according to this embodiment, compared with the first embodiment, the number of switch circuits to be used can be reduced by one.

The first to third embodiments described as examples the cases where GMSK/GPRS/EDGE modulation was performed at the GSM/DCS/PCS frequency bands, and with respect to these modes according to the TDMA system, a UMTS (W-CDMA) mode was added as a mode according to the CDMA system. In contrast to this, GMSK/GPRS/EDGE modulation is performed at the GSM/DCS/PCS frequency bands, and with respect to these modes according to the TDMA system, a narrow-band CDMA mode as a mode according to the CDMA system is added in the frequency band of 1,700 to 1,900 MHz of the DCS/PCS modes. In this case, needless to say, using exactly the same circuit configurations except that the narrow-band CDMA mode is used instead of the UMTS, exactly the same configuration can be obtained as in each of the first to third embodiments.

Fourth Embodiment

Figure 4:
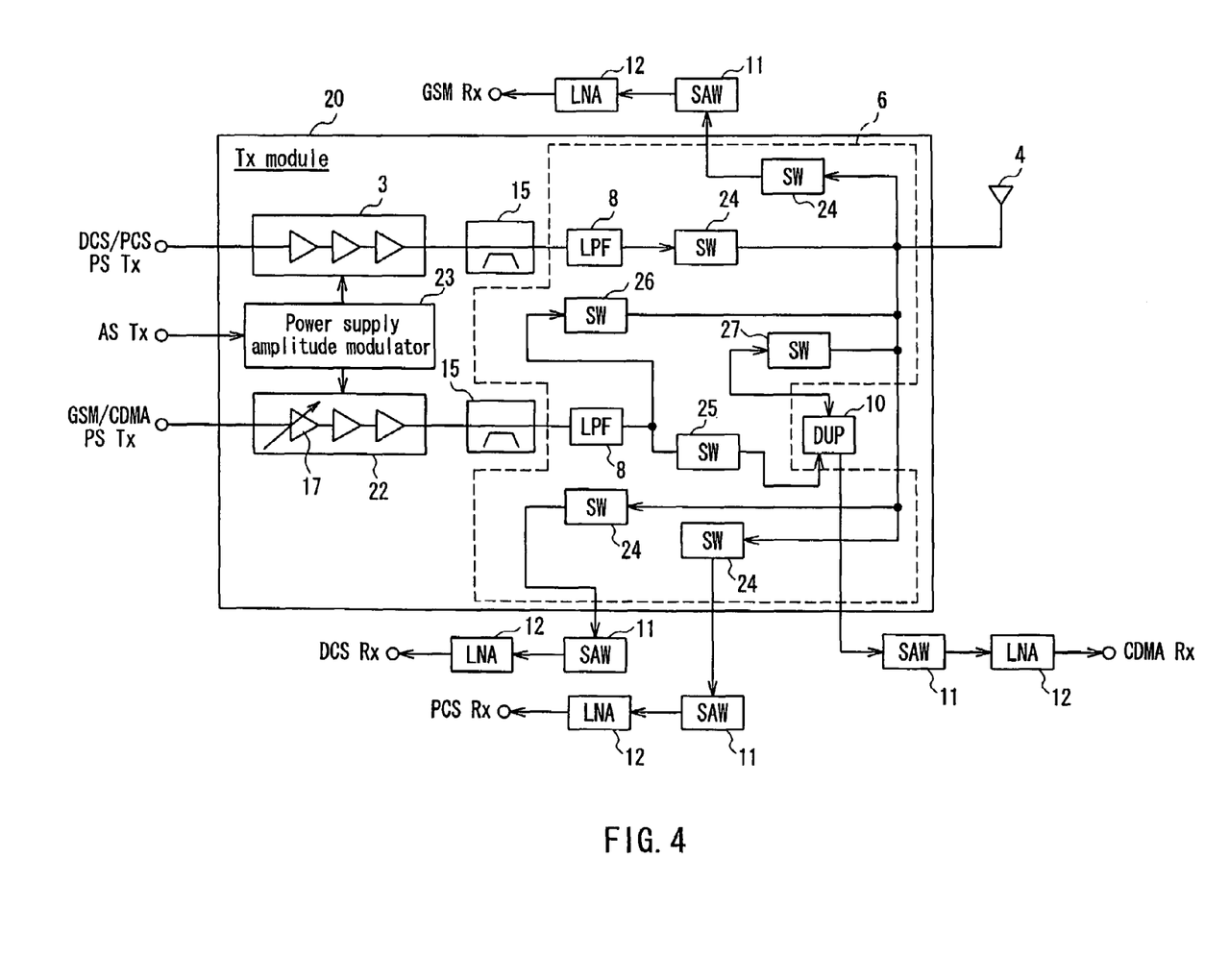
FIG. 4 is a block diagram showing an example of the configuration of a high-frequency circuit device according to a fourth embodiment of the present invention.

FIG. 4 is a block diagram showing an example of the configuration of a high-frequency circuit device according to a fourth embodiment of the present invention.

The first to third embodiments described as examples the cases where GMSK/GPRS/EDGE modulation was performed at the GSM/DCS/PCS frequency bands, and with respect to these modes according to the TDMA system, the UMTS (W-CDMA) mode was added as a mode according to the CDMA system. In contrast to this, as shown in FIG. 4, the fourth embodiment describes the case where GMSK/GPRS/EDGE modulation is performed at the GSM/DCS/PCS frequency bands, and with respect to these modes according to the TDMA system, a narrow-band CDMA mode as a mode according to the CDMA system is added in the frequency band of 800 to 900 MHz of the GSM mode.

In FIG. 4, a DCS/PCS phase signal DCS/PCS PS Tx in the frequency band of 1,700 to 1,900 MHz is input to a first high-frequency amplifier 3 of a transmission amplifier circuit and amplified. Further, a GSM/narrow-band CDMA phase signal GSM/CDMA PS Tx in the frequency band of 800 to 900 MHz is input to a second high-frequency amplifier 22 of the transmission amplifier circuit and amplified. In the second high-frequency amplifier 22, a gain-controllable driver amplifier 17 is housed to perform dynamic range expansion according to the CDMA system.

Meanwhile, in order to perform polar modulation, GSM/CDMA and DCS/PCS amplitude signals AS Tx are input from a power supply amplitude modulator 23 to power supply terminals of the first high-frequency amplifier 3 and the second high-frequency amplifier 22, respectively.

Herein, an output signal of the second high-frequency amplifier 22 is input to a duplexer (shared device: DUP)10 via a coupler 15, a LPF 8, and an upstream switch circuit 25. The duplexer 10 is a filter for separating signals according to their frequency bands so as to perform transmission and reception simultaneously. When an antenna 4 is brought close to metal or a human head, an impedance deviates from 50 ohms and thus might result in the deterioration of a distortion characteristic in a UMTS operation of the second high-frequency amplifier 22. Such deterioration can be avoided by a polar modulation operation.

Furthermore, in order to switch between operations of GSM transmission and CDMA simultaneous transmission/reception, a bypass switch circuit 26 is provided between the second high-frequency amplifier 22 and the antenna 4 so as to bypass the duplexer 10. A downstream switch circuit 27 further is provided between the duplexer 10 and the antenna 4, thereby providing a configuration that allows switching into and out of a CDMA operation.

As in the conventional case, switch circuits 24 that are connected directly to the antenna 4 are provided so as to switch over the first high-frequency amplifier 3 for DCS/PCS transmission and to switch between operations of GSM, DCS and PCS reception. These switch circuits 24, 25, 26 and 27 are formed of a high-frequency switch (SW) made from GaAs. Further, this high-frequency switch may be formed of a pin diode. Further, in many cases, LPFs 8 for suppressing harmonics from the high-frequency amplifiers are integrated into a switch module 6 with these switch circuits. Further, an entire high-frequency amplifier circuit also may be integrated into a module as a Tx module 20.

As described above, according to this embodiment, compared with the conventional case, the number of high-frequency amplifiers to be used can be reduced from three to two, and the need to provide an isolator further can be eliminated, and thus a cost reduction by nearly half can be achieved. Further, an electric current consumed in the second high-frequency amplifier 22 in a CDMA operation can be reduced by about 20%, namely, by 40 to 70 mA.

Fifth Embodiment

Figure 5:
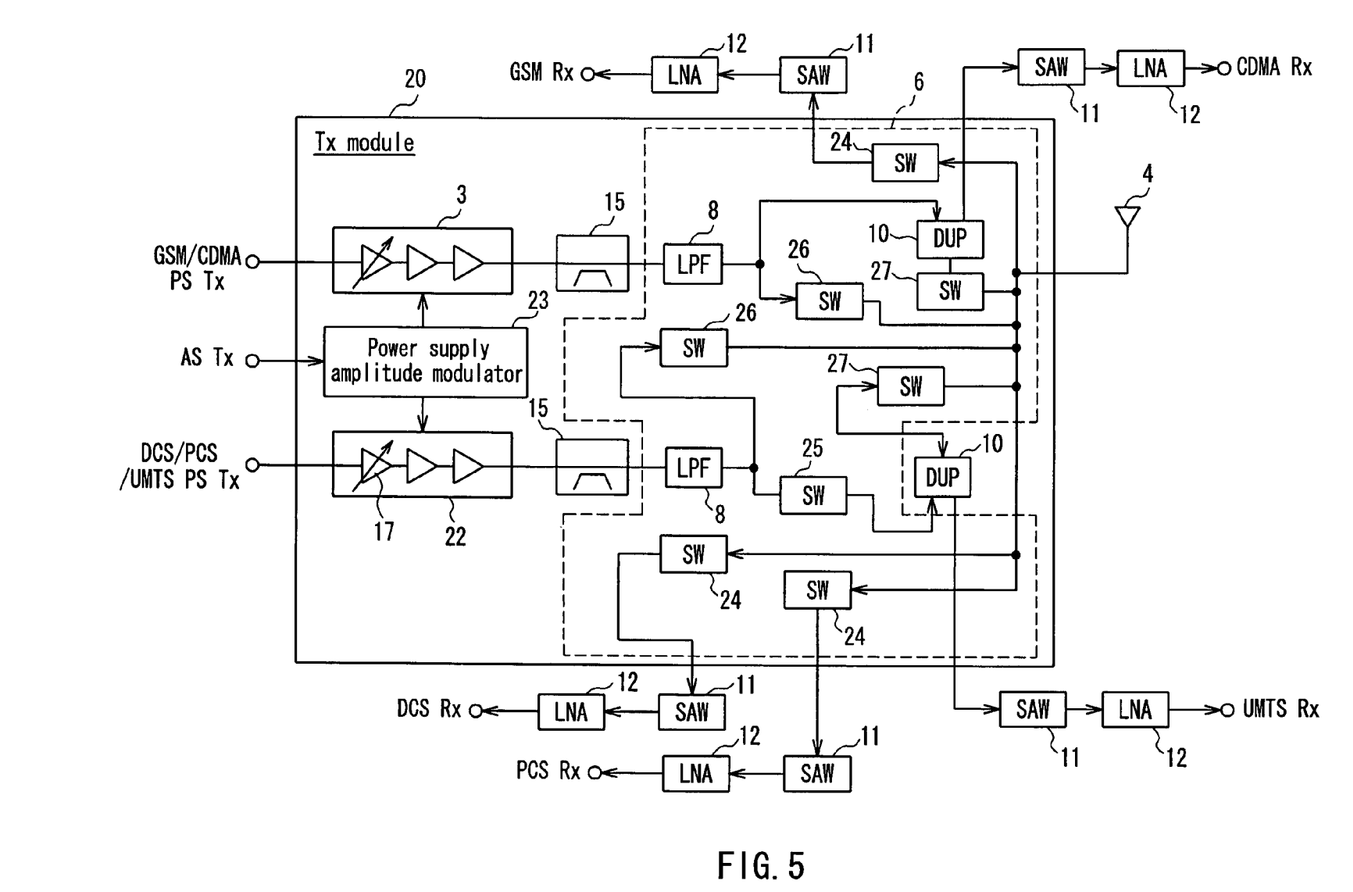
FIG. 5 is a block diagram showing an example of the configuration of a high-frequency circuit device according to a fifth embodiment of the present invention.

FIG. 5 is a block diagram showing an example of the configuration of a high-frequency circuit device according to a fifth embodiment of the present invention.

The first to fourth embodiments described as examples the cases where GMSK/GPRS/EDGE modulation was performed at the GSM/DCS/PCS frequency bands, and with respect to these modes according to the TDMA system, the UMTS (W-CDMA) mode or the narrow-band CDMA mode was added as a mode according to the CDMA system. In contrast to this, as shown in FIG. 5, in the fifth embodiment, GMSK/GPRS/EDGE modulation is performed at the GSM/DCS/PCS frequency bands, and with respect to these modes according to the TDMA system, UMTS and narrow-band CDMA modes are added as modes according to the CDMA system respectively in the frequency band of 1,700 to 1,900 MHz and the GSM frequency band of 800 to 900 MHz. In this case, a circuit configuration that functions with respect to both of the TDMA system and the CDMA system can be used in exactly the same manner, and with respect to the GSM frequency band of 800 to 900 MHz and the frequency band of 1,700 to 1,900 MHz, the same circuit configuration can be used. This can provide an effect of reducing the number of high-frequency amplifiers to be used, which should be four, to two, and a first high-frequency amplifier 3 has the same configuration as that of a second high-frequency amplifier 22 including a driver amplifier 17.

The high-frequency circuit device according to the present invention has an advantage of achieving low cost and low power consumption, and thus is useful with respect to a mobile phone system in which the TDMA system and the CDMA system coexist, specifically, for applications such as a mobile phone that is conformable to a system in which the GSM/DCS/PCS/GPRS/EDGE and the UMTS coexist, a system in which the GSM/DCS/PCS/GPRS/EDGE and narrow-band CDMA coexist, or a system in which the GSM/DCS/PCS/GPRS/EDGE, the UMTS and the narrow-band CDMA coexist.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A high-frequency circuit device that is conformable to both of a Time Division Multiple Access (TDMA) system and a Code Division Multiple Access (CDMA) system as well as a plurality of frequency bands, comprising:
   a transmission amplifier circuit for transmitting high-frequency power from an antenna, the transmission amplifier circuit being shared in the TDMA system and the CDMA system;
   a duplexer that is provided for performing simultaneous transmission/reception according to the CDMA system;
   upstream and downstream switch circuits in a direction of transmission that are provided so as to sandwich the duplexer between the transmission amplifier circuit and the antenna and are switched on when the simultaneous transmission/reception is performed according to the CDMA system; and
   a bypass switch circuit that bypasses the upstream and downstream switch circuits and the duplexer;
   wherein the transmission amplifier circuit comprises;
   a first high-frequency amplifier that performs Gaussian filtered minimum shift keying (GMSK) modulation, General Packet Radio Service (GPRS) modulation, or Enhanced Data rates for GSM Evolution (EDGE) modulation so as to conform to a frequency band of Global System for Mobile Communications (GSM) according to the TDMA system; and
   a second high-frequency amplifier that is used with respect to both of the TDMA system and the CDMA system, performs the GMSK modulation, the GPRS modulation, or the EDGE modulation so as to conform to a frequency band of Digital Cellular System (DCS) or Personal Communication Services (PCS) according to the TDMA system, and operates according to a narrow-band CDMA system or a W-CDMA (UMTS) system so as to conform to a frequency band of Universal Mobile Telecommunication System (UMTS) according to the ODMA system.

2. A high-frequency circuit device that is conformable to both of a Time Division Multiple Access (TDMA) system and a Code Division Multiple Access (CDMA) system as well as a plurality of frequency bands, comprising:
   a transmission amplifier circuit for transmitting high-frequency power from an antenna, the transmission amplifier circuit being shared in the TDMA system and the CDMA system;
   a duplexer that is provided for performing simultaneous transmission/reception according to the CDMA system;
   upstream and downstream switch circuits in a direction of transmission that are provided so as to sandwich the duplexer between the transmission amplifier circuit and the antenna and are switched on when the simultaneous transmission/reception is performed according to the CDMA system; and
   a bypass switch circuit that bypasses the upstream and downstream switch circuits and the duplexer;
   wherein the transmission amplifier circuit comprises:
   a first high-frequency amplifier that performs Gaussian filtered minimum shift keying (GMSK) modulation, General Packet Radio Service (GPRS) modulation, or Enhanced Data rates for GSM Evolution (EDGE) modulation so as to conform to a frequency band of Digital Cellular System (DCS) or Personal Communication Services (PCS) according to the TDMA system; and
   a second high-frequency amplifier that performs the GMSK modulation, the GPRS modulation, or the EDGE modulation so as to conform to a frequency band of Global System for Mobile Communications (GSM) according to the TDMA system, or operates according to a narrow-band CDMA system or a W-CDMA (UMTS) system so as to conform to a frequency band of the CDMA system.

3. A high-frequency circuit device that is conformable to both of a Time Division Multiple Access (TDMA) system and a Code Division Multiple Access (CDMA) system as well as a plurality of frequency bands, comprising:
   a transmission amplifier circuit for transmitting high-frequency power from an antenna, the transmission amplifier circuit being shared in the TDMA system and the CDMA system;
   a duplexer that is provided for performing simultaneous transmission/reception according to the CDMA system;
   upstream and downstream switch circuits in a direction of transmission that are provided so as to sandwich the duplexer between the transmission amplifier circuit and the antenna and are switched on when the simultaneous transmission/reception is performed according to the CDMA system; and
   a bypass switch circuit that bypasses the upstream and downstream switch circuits and the duplexer;
   wherein the transmission amplifier circuit comprises:
   a first high-frequency amplifier that is used with respect to both of the TDMA system and the CDMA system, performs Gaussian filtered minimum shift keying (GMSK) modulation, General Packet Radio Service (GPRS) modulation, or Enhanced Data rates for GSM Evolution (EDGE) modulation so as to conform to a frequency band of Digital Cellular System (DCS) or Personal Communication Services (PCS) according to the TDMA system, and operates according to a narrow-band CDMA system or a W-CDMA (UMTS) system so as to conform to a frequency band of Universal Mobile Telecommunication System (UMTS) according to the CDMA system; and
   a second high-frequency amplifier that performs the GMSK modulation, the GPRS modulation, or the EDGE modulation so as to conform to a frequency band of Global System for Mobile Communications (GSM) according to the TDMA system, and operates according to the narrow-band CDMA system or the W-CDMA (UMTS) system so as to conform to a frequency band of the CDMA system.

4. A high-frequency circuit device that is conformable to both of a Time Division Multiple Access (TDMA) system and a Code Division Multiple Access (CDMA) system as well as a plurality of frequency bands, comprising:
   a transmission amplifier circuit for transmitting high-frequency power from an antenna, the transmission amplifier circuit being shared in the TDMA system and the CDMA system;
   a duplexer that is provided for performing simultaneous transmission/reception according to the CDMA system;
   a downstream switch circuit in a direction of transmission that is provided between the duplexer and the antenna and is switched on when the simultaneous transmission/reception is performed according to the CDMA system; and
   a bypass switch circuit that bypasses the downstream switch circuit and the duplexer;
   wherein the transmission amplifier circuit comprises:
   a first high-frequency amplifier that performs Gaussian filtered minimum shift keying (GMSK) modulation, General Packet Radio Service (GPRS) modulation, or Enhanced Data rates for GSM Evolution (EDGE) modulation so as to conform to a frequency band of cations (GSM) according to the TDMA system; and
   a second high-frequency amplifier that is used with respect to both of the TDMA system and the CDMA system, performs the GMSK modulation, the GPRS modulation, or the EDGE modulation so as to conform to a frequency band of Digital Cellular System (DCS) or Personal Communication Services (PCS) according to the TDMA system, and operates according to a narrow-band CDMA system or a W-CDMA (UMTS) system so as to conform to a frequency band of Universal Mobile Telecommunication System (UMTS) according to the CDMA system.

5. A high-frequency circuit device that is conformable to both of a Time Division Multiple Access (TDMA) system and a Code Division Multiple Access (CDMA) system as well as a plurality of frequency bands, comprising:
   a transmission amplifier circuit for transmitting high-frequency power from an antenna, the transmission amplifier circuit being shared in the TDMA system and the CDMA system;
   a duplexer that is provided for performing simultaneous transmission/reception according to the CDMA system;
   a downstream switch circuit in a direction of transmission that is provided between the duplexer and the antenna and is switched on when the simultaneous transmission/reception is performed according to the CDMA system; and
   a bypass switch circuit that bypasses the downstream switch circuit and the duplexer;
   wherein the transmission amplifier circuit comprises:
   a first high-frequency amplifier that performs Gaussian filtered minimum shift keying (GMSK) modulation, General Packet Radio Service (GPRS) modulation, or Enhanced Data rates for GSM Evolution (EDGE) modulation so as to conform to a frequency band of Digital Cellular System (DCS) or Personal Communication Services (PCS) according to the TDMA system; and
   a second high-frequency amplifier that performs the GMSK modulation, the GPRS modulation, or the EDGE modulation so as to conform to a frequency band of Global System for Mobile Communications (GSM) according to the TDMA system, or operates according to a narrow-band CDMA system or a W-CDMA (UMTS) system so as to conform to a frequency band of the CDMA system.

6. A high-frequency circuit device that is conformable to both of a Time Division Multiple Access (TDMA) system and a Code Division Multiple Access (CDMA) system as well as a plurality of frequency bands, comprising:
   a transmission amplifier circuit for transmitting high-frequency power from an antenna, the transmission amplifier circuit being shared in the TDMA system and the CDMA system;
   a duplexer that is provided for performing simultaneous transmission/reception according to the CDMA system;
   a downstream switch circuit in a direction of transmission that is provided between the duplexer and the antenna and is switched on when the simultaneous transmission/reception is performed according to the CDMA system; and
   a bypass switch circuit that bypasses the downstream switch circuit and the duplexer;

wherein the transmission amplifier circuit comprises:

a first high-frequency amplifier that is used with respect to both of the TDMA system and the CDMA system, performs Gaussian filtered minimum shift keying (GMSK) modulation, General Packet Radio Service (GPRS) modulation, or Enhanced Data rates for GSM Evolution (EDGE) modulation so as to conform to a frequency band of Digital Cellular System (DCS) or Personal Communication Services (PCS) according to the TDMA system, and operates according to a narrow-band CDMA system or a W-CDMA (UMTS) system so as to conform to a frequency band of Universal Mobile Telecommunication System (UMTS) according to the CDMA system; and a second high-frequency amplifier that performs the GMSK modulation, the GPRS modulation, or the EDGE modulation so as to conform to a frequency band of Global System for Mobile Communications (GSM) according to the TDMA system, and operates according to the narrow-band CDMA system or the W-CDMA (UMTS) system so as to conform to a frequency band of the CDMA system.

* * * * *